Nov. 20, 1945.  H. A. STORCH  2,389,562
FLEXIBLE MOUNTING DEVICE
Filed Sept. 13, 1943

INVENTOR.
HAROLD A. STORCH
BY
Kwis Hudson, Boughton & Williams
ATTORNEYS

Patented Nov. 20, 1945

2,389,562

UNITED STATES PATENT OFFICE 2,389,562

FLEXIBLE MOUNTING DEVICE

Harold A. Storch, Fairview Village, Ohio, assignor to Harris Products Company, Cleveland, Ohio, a corporation of Ohio Application September 13, 1943, Serial No. 502,090

3 Claims. (Cl. 248—358)

This invention relates to flexible mounting devices and aims to provide an improved device of this kind which is of a simplified and practical construction capable of being economically manufactured and easily installed.

Another object of this invention is to provide an improved flexible mounting device in which resilient blocks or bushings confined in a housing member serve to yieldingly anchor a connecting member therein and to hold such members against metallic contact with each other.

The invention can be further briefly summarized as consisting in certain novel combinations and arrangements of parts hereinafter described and particularly set out in the appended claims.

In the accompanying sheet of drawings—

Figure 1:
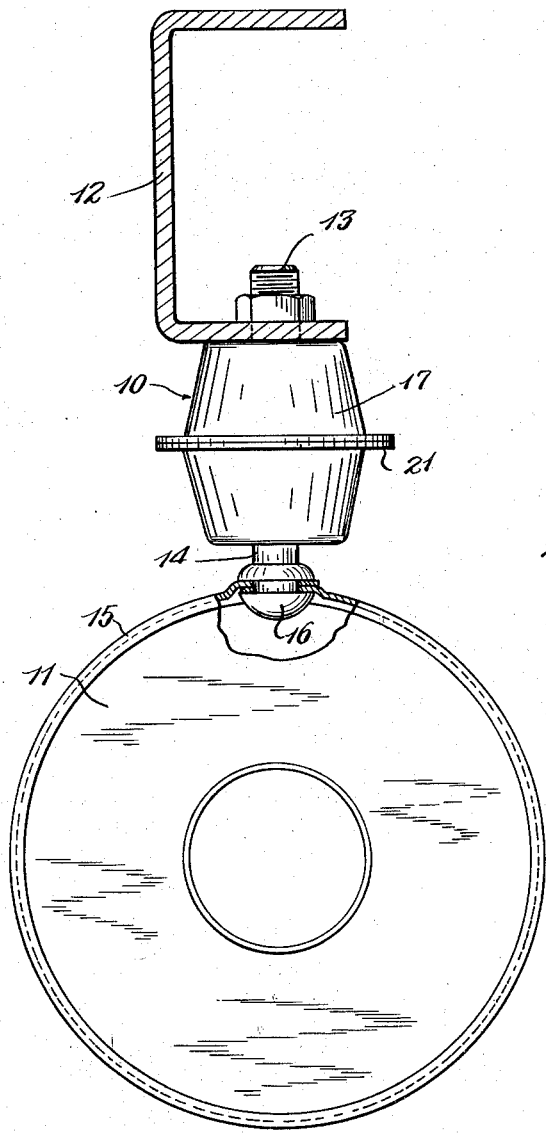
Fig. 1 is an end elevational view partly in section showing my improved flexible mounting device being used as a muffler support.
Figure 4:
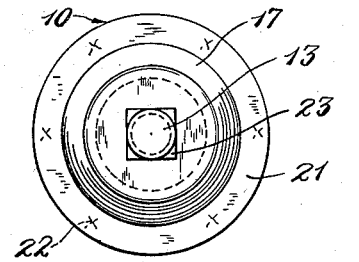
Fig. 4 shows the device as viewed from the opposite end thereof.

My improved device can be applied to various uses where there is need for an efficient flexible mounting which can be economically manufactured and easily installed. In the drawing I show my flexible device 10 embodied in a support for a muffler 11. In the installation which is here illustrated by way of example, one end of the flexible device 10 is connected with a frame member 12 by the bolt 13. At the other end of the device a connecting member 14 projects therefrom and is connected with a band or ring 15 which encircles the muffler 11. The member 14 may be connected with the band 15 by extending a portion of such connecting member through the band and riveting or upsetting such portion as indicated at 16.

The flexible mounting device 10 comprises a housing 17 having a pair of resilient blocks or bushings 18 and 19 confined therein, and the above-mentioned connecting member 14 which is anchored or flexibly retained in the housing by the resilient bushings. The connecting member 14 is anchored in the housing by having on or adjacent its inner end a thrust member or enlargement 20 which is disposed between the adjacent ends of the bushings.

The housing 17 comprises a pair of cup-shaped sheet metal members 17a and 17b having laterally projecting flanges 21 surrounding their open ends. The cup-shaped members 17a and 17b are disposed in co-axial relation and have their flanges 21 connected in face-to-face engagement by being spot-welded together as indicated at 22. The housing member 17a has a non-circular opening 23 in the end wall thereof through which the stem of the bolt member 13 projects and in which such stem is held against rotation to facilitate the mounting of the flexible device on the frame member 12. The bolt 13 is held in place by having its head located between the bushing 18 and the end wall of the housing member 17. The end wall of the housing member 17b has a relatively larger opening 24 therein through which the connecting member 14 extends.

Figure 2:
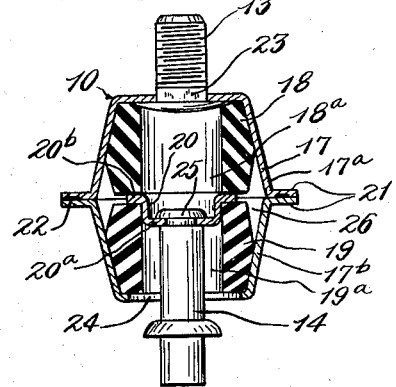
Fig. 2 is a longitudinal sectional view taken through the flexible mounting device before installation.
Figure 3:
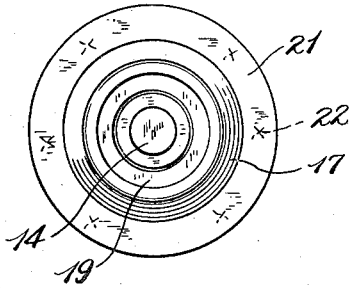
Fig. 3 is an end view of the device.

The resilient bodies 18 and 19, which are here shown as being molded or preformed blocks or bushings having relatively large openings 18a and 19a therein, are made of soft-vulcanized rubber or any other suitable resilient or flexible material having rubber-like characteristics. The bushings 18 and 19 are co-axially disposed in the housing 17 with their openings 18a and 19a in substantial alignment and with the thrust member 20 disposed between their adjacent ends. The thrust member 20 can be formed integral with the connecting member 14, or, as shown in the drawing, can be a separate part with which the member 14 is connected. The thrust member 20 is here shown as being a shouldered sheet metal member or washer having an axially offset portion 20a which telescopes into the opening 19a of the bushing 19, so that lateral shifting of the thrust member will be resisted by such bushing. The inner end of the connecting member 14 may be attached to the axially offset portion 20a of the thrust member by riveting or peening the inner end of the member 14 as indicated at 25 in Fig. 2. The laterally extending flange portion 20b of the thrust member is preferably of a smaller diameter or size than the bushings, so that the edge thereof cannot come into metallic contact with the housing 17.

As shown in the drawing, the cup-shaped housing members 17a and 17b are similarly tapered so that they increase in size or diameter as their flanges 21 are approached. When these housing members are brought together to form the housing 17, the bushings 18 and 19 therein are subjected to compression by the end walls and tapered side walls of the housing members and the bushings are thereby caused to grip and hold the thrust member 20 therebetween. The connecting member 14 is thus yieldably anchored in the housing 17 with the stem portion thereof projecting therefrom through the opening 19a of the bushing 19 and through the opening 24 in the end wall of the housing member 17b. The opening of the bushing 19 is of a size such that the stem portion of the connecting member 14 will have clearance therein and can tilt or swing relative to the axis of the device. The opening 24 of the housing member 17b is preferably made larger than the opening of the bushing 19 so that the member 14 will always be prevented by the bushing 19 from coming into metallic contact with any portion of the housing member 17b.

The bushings 18 and 19 are of such size, shape and volume relative to the housing members 17a and 17b that a space 26 will be left in the completed device between the housing wall and the outside of the bushings at their meeting ends. This space accommodates the relative tilting or rocking of connecting member 14 and the accompanying lateral shifting of the thrust member 20 and the meeting ends of the bushings.

From the foregoing description and the accompanying drawing it will now be readily seen that I have provided a flexible mounting device of a simplified and practical form which can be economically manufactured and easily installed. It will be seen also that the flexibility of this mounting device permits relative axial and tilting movements without having any of the parts come into metal-to-metal contact with each other, and results in shocks and vibrations being effectively cushioned and absorbed.

While I have illustrated and described my improved flexible mounting device in more or less detail, it will be understood, of course, that I do not wish to be correspondingly limited but regard my invention as including all changes and modifications coming within the spirit of the invention and the scope of the appended claims.

Having thus described my invention, I claim:

1. A flexible mounting device, comprising a housing formed by a pair of cup members having their open ends connected together, means for connecting the housing with one of a pair of members to be connected, a pair of rubber bushings having substantially coaxially extending openings and disposed in said housing so that their adjacent ends are spaced from the side walls of the housing, and a connecting member adapted for connection with the other member of said pair and having on its inner end a washer which is anchored between said adjacent ends of the bushings, said washer lying wholly inwardly of the outer peripheral faces of the bushings and having a shoulder portion engaging in the opening of one of the bushings, said cup members being tapered so as to subject said bushings to compression against said washer.

2. In a device of the character described, a housing formed of connected oppositely tapered cup sections and having an opening in the wall thereof, means for connecting the housing with one of a pair of members to be connected, a pair of substantially axially aligned rubber bushings having openings therein and confined in said housing with their adjacent ends spaced from the side wall of the housing and with the bushings subjected to compression by said tapered cup sections, and a connecting member having an enlarged shouldered portion held between the adjacent ends of said bushings and engaging in the opening of one of the bushings and a stem portion extending through and having clearance in the opening of one of the bushings and projecting from the housing opening for connection with the other of said pair of members, said enlarged portion lying wholly inwardly of the outer peripheral faces of said bushings.

3. In a device of the character described, a housing comprising a pair of oppositely tapered cup-shaped elements having flanged ends connected together, one of said elements having a non-circular opening in the end wall thereof and the other of said elements having a relatively larger opening in its end wall, means projecting from the housing through said non-circular opening for connection with one of a pair of members to be connected, said projecting means having a non-circular portion held against relative rotation by said non-circular opening and also having a head located inside the housing, a second connecting means adapted for connection with the other of said pair of members and having a stem portion extending into the housing through said relatively larger opening, said second connecting means having a shouldered enlargement adjacent its inner end, and a pair of resilient bushings having substantially axially aligned openings and disposed in said housing and subjected to compression by said tapered elements with said shouldered enlargement disposed between the adjacent ends of the bushings and engaging in the opening of one of the bushings and with said stem portion also extending through the opening of one of the bushings, said bushings holding said second connecting means out of metallic contact with the housing and yieldably anchoring said second connecting means therein and also holding the head of said projecting means against the housing element having said non-circular opening, the adjacent ends of said bushings being spaced from the side wall of the housing and said shouldered enlargement lying wholly inwardly of the outer peripheral faces of the bushings.

HAROLD A. STORCH.